United States Patent [19]
Orillo

[11] Patent Number: 5,862,646
[45] Date of Patent: Jan. 26, 1999

[54] DEVICE FOR TRANSFERRING BLISTER PACKS FROM A WORKING STATION TO A PACKAGING LINE

[75] Inventor: Antonio Orillo, Casalecchio Di Reno, Italy

[73] Assignee: I.M.A. Industria Macchine Automatiche S.p.A., Ozzano Emilia, Italy

[21] Appl. No.: 968,192

[22] Filed: Nov. 12, 1997

[30] Foreign Application Priority Data

Nov. 15, 1996 [IT] Italy .................................. B096A0587

[51] Int. Cl.$^6$ ...................................................... B65B 57/00
[52] U.S. Cl. ............................ 53/53; 198/468.4; 198/375; 198/345.1; 198/488.2
[58] Field of Search .............................. 198/488.2, 345.1, 198/468.4, 341–359, 360; 53/53

[56] References Cited

U.S. PATENT DOCUMENTS 3,601,393  8/1971  Hawley ..................................... 198/375
3,785,116  1/1974  Munz et al. ............................... 53/140

*Primary Examiner*—John Sipos
*Assistant Examiner*—Matthew Luby

[57] ABSTRACT

A device for transferring blister packs comprises an intermediate station situated between a working station (3) and a packaging line. The intermediate station includes a clamp for receiving and holding at least one blister pack. First and second groups of suction cups are driven by a two-arm mechanism situated in the intermediate station. In a first position, the first group of suction cups is placed in the working station for picking up one blister pack while the second group of suction cups is over the intermediate station for picking up another blister pack temporarily held by the clamp. In a second position, the first group of suction cups is located over the intermediate station, to release the blister pack previously picked up, that is received and held by the clamp, while the second group of suction cups is over the packaging line to deliver the blister pack previously picked up. When a blister pack is to be eliminated, the clamp is made to open, so that defective blister pack is not transferred to the packaging line.

7 Claims, 3 Drawing Sheets

DEVICE FOR TRANSFERRING BLISTER PACKS FROM A WORKING STATION TO A PACKAGING LINE

BACKGROUND OF THE INVENTION

This invention relates to packaging of products into a blister band, that is sealed with a film after filling with the products.

More precisely, the invention relates to a device for transferring blister packs from a working station, where this blister strip is e.g. cut into individual blister packs, to a packaging line, where these blister packs are put into cases.

DESCRIPTION OF THE PRIOR ART

It is known that in machines for manufacturing blister packs for e.g. pharmaceuticals, the blister band, after having been filled with respective products and sealed with a cover film, is moved stepwise to a cutting station, where it is cut into individual blister packs.

Then, the blister packs are fed to a packaging line.

During the above mentioned steps, it is necessary to clear the production line of those blister packs which are defective due to incomplete filling or other causes.

For this purpose, some packaging machines are equipped with means for removing defective blister packs in the region of the cutting station.

In other cases, the defective blister packs are not cut from the blister strip, but left together with the off-cuts, that is later on collected and recycled or sent to disposal.

According to another solution, all the blister packs are moved to the packaging line and suitable means, acting e.g. in transversal direction with respect to the packaging line, remove the defective blister packs along the same packaging line before introducing them into cases.

However, the above mentioned solutions for removing defective blister packs are not fully satisfactory, because these removing means have a considerably complex structure, and because they can interfere with the packaging line regular working.

SUMMARY OF THE INVENTION

The object of the present invention is to provide a device which allows to transfer the blister packs from a working station, particularly a station for cutting individual packs, to a packaging line with contemporary removal of defective blister packs.

Another object of the present invention is to provide a simple and practical device capable of doing what above assuring high working speed of the machine.

The above mentioned objects are achieved, in accordance with the contents of the claims, by a device for transferring blister packs from a working station to a packaging line, said blister packs being made available at said working station, said device comprising:

an intermediate station situated between said working station and said packaging line;

first gripping means, for picking up at least one blister pack in the working station and for delivering said first blister pack to said intermediate station;

second gripping means, working in reciprocal phase relation with said first gripping means, for picking up at least one blister pack in said intermediate station, and for delivering said second blister pack to said packaging line;

clamp means located in said intermediate station for receiving and holding said at least one blister pack during transferring to said packaging line, said clamp means being operated to open when a defective blister pack is to be discarded.

BRIEF DESCRIPTION OF THE DRAWINGS

The characteristics of the invention will become apparent from the following description with specific reference to the enclosed drawings, in which.

DISCLOSURE OF THE PREFERRED EMBODIMENT

Figure 1:
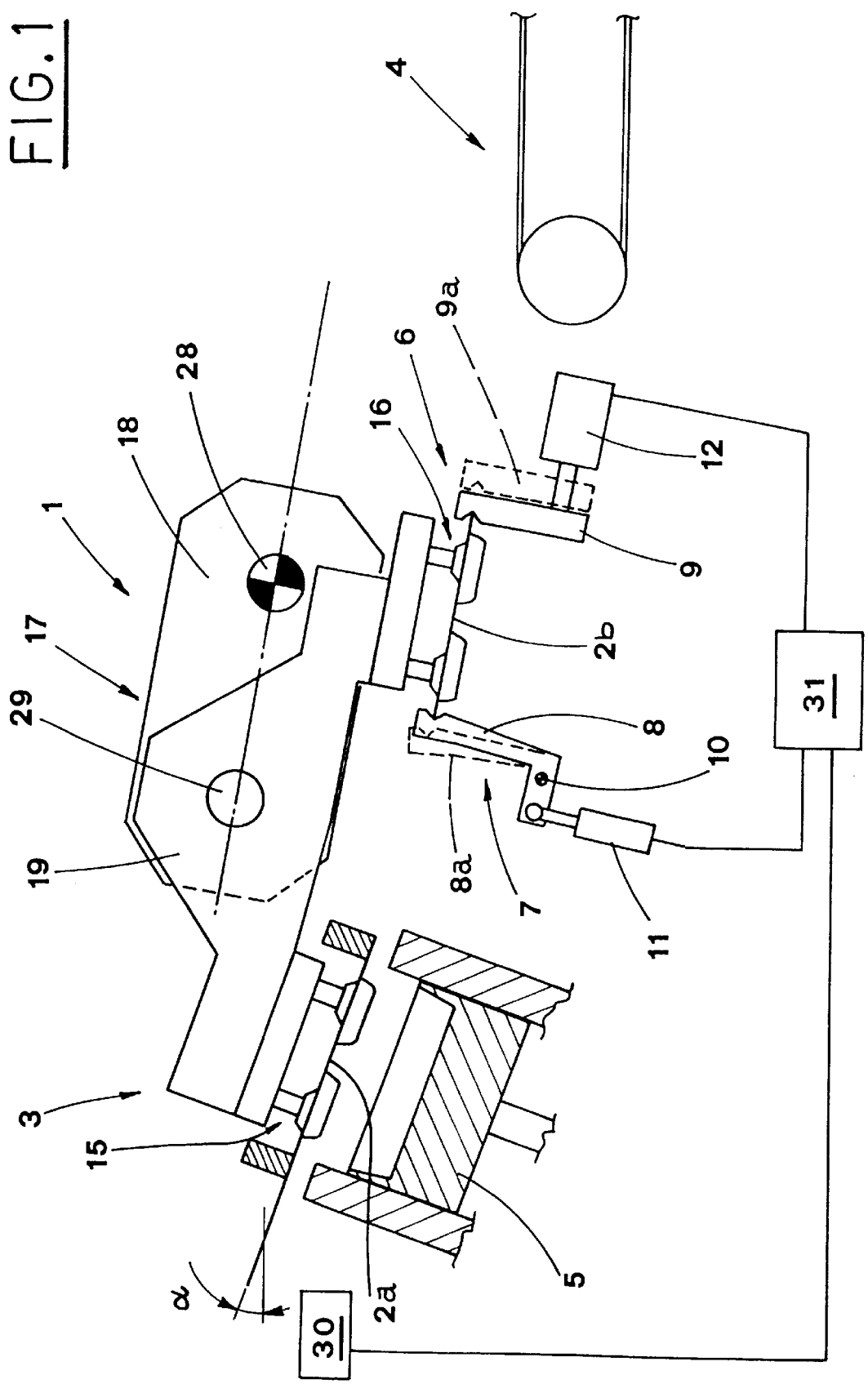
FIG. 1 shows the device for transferring blister packs to a packaging line in a schematic side view.

With reference to the above described Figures, numeral 1 indicates a device for transferring blister packs 2 from a working station 3 to a packaging line 4, for introducing the blister packs 2 into cases.

In particular, in the working station 3, the blister band, previously filled with products and sealed with a cover film, is cut into individual blister packs 2 by a cutter 5.

The blister strips, inclined with respect to a generic horizontal plane at a suitable angle $\alpha$, are made available at the working station 3 one by one.

The transfer device 1 includes an intermediate station 6, situated between the working station 3 and the packaging line 4. The intermediate station 6 is equipped with clamp means 7 for receiving and temporarily holding at least one blister pack 2, that is kept inclined with respect to the horizontal plane at a pre-established angle.

These clamp means 7 preferably include a first bracket 8 and a second bracket 9.

The first bracket 8 is supported by a transversal pivot 10, and oscillates in a vertical plane longitudinal to the blister packs movement direction.

The second bracket 9 is moved while keeping the same attitude.

The brackets 8,9 are driven by respective actuators 11,12, so as to move between an opening position, indicated with broken lines 8a,9a in FIG. 1, in which at least one blister pack is received therebetween, and a closed position, in which the received blister pack is held.

The brackets 8,9 feature grooves 13,14 for housing opposite edges of the blister packs 2.

Figure 4:
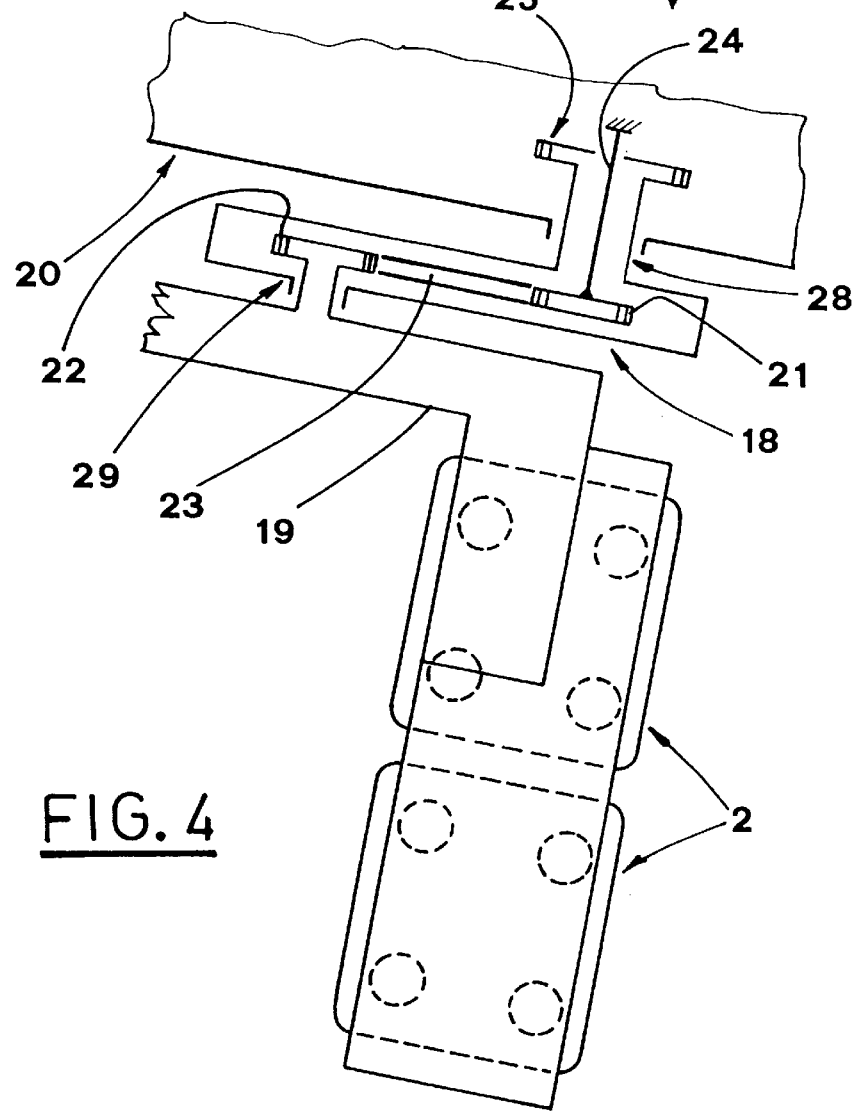
FIG. 4 shows the device in a schematic cross-section view taken along line IV—IV of FIG. 3.

The device can operate simultaneously with two or more blister packs, arranged in a row, which have been cut from the blister strip and transferred to the packaging line parallel to each other, as shown for example in FIG. 4.

Obviously, in this case, the brackets 8, 9 of the clamp 7 hold both the blister packs, at the same time.

First and second gripping means 15,16, that work in reciprocal phase relation, are situated over the intermediate station 6, and include in particular suction cups connected to suction means of known type.

More precisely, a mechanism 17 drives the gripping means 15,16, which are mounted thereto. The montage system allow easy change over of the mechanism and gripping means when the size of the blister packs is changed.

The mechanism 17 includes (FIG. 4) a first arm 18 oscillating around a pivot 28 and in a vertical plane longitudinal to the packaging line 4, near the machine stationary frame.

A second arm 19, supported by the first arm 18, rotates on a pivot 29 and in a vertical plane parallel to the oscillation plane of the first arm 18.

Figure 2:
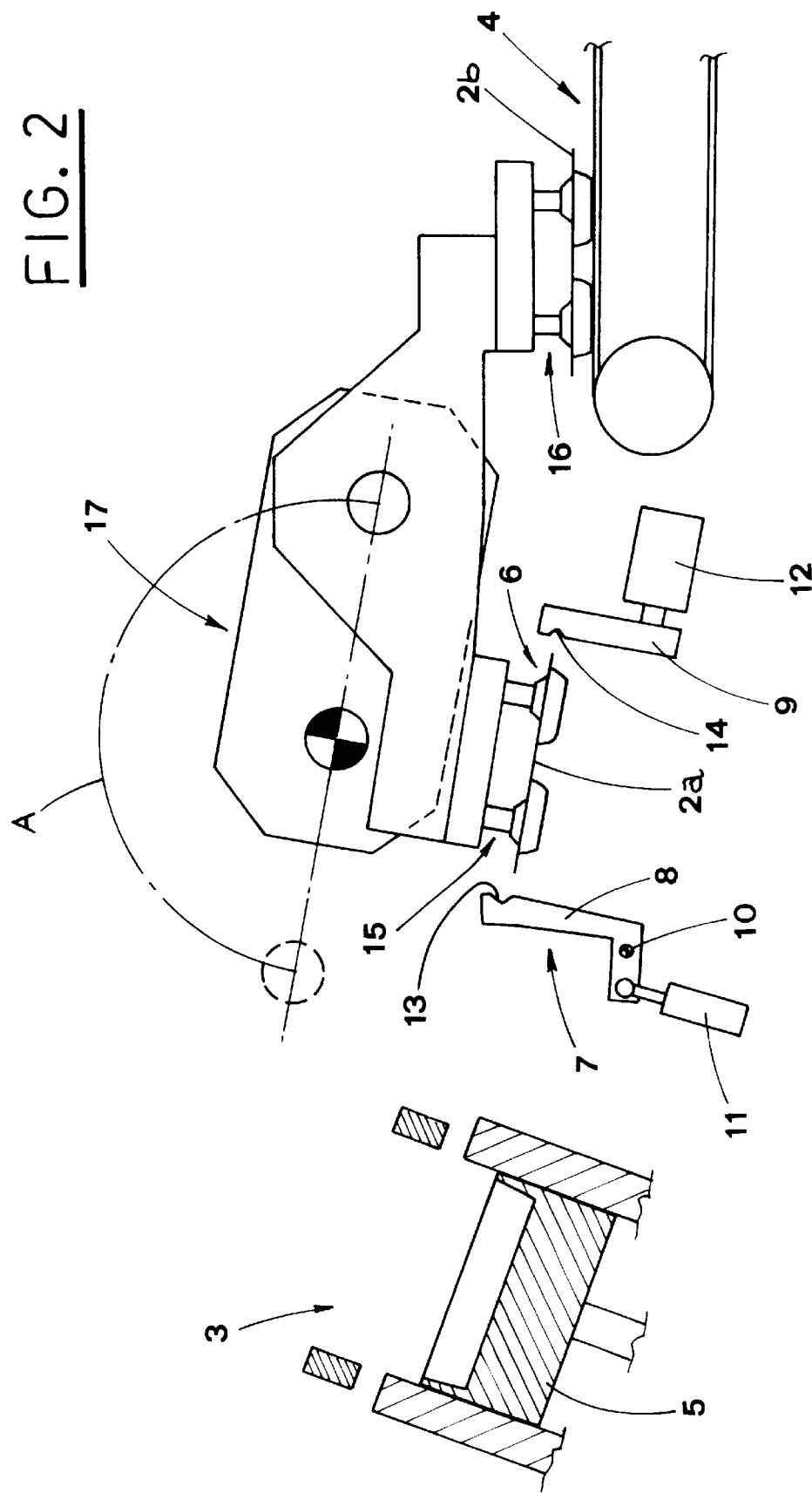
FIG. 2 shows the device in a different working step, in the same side view.
Figure 3:
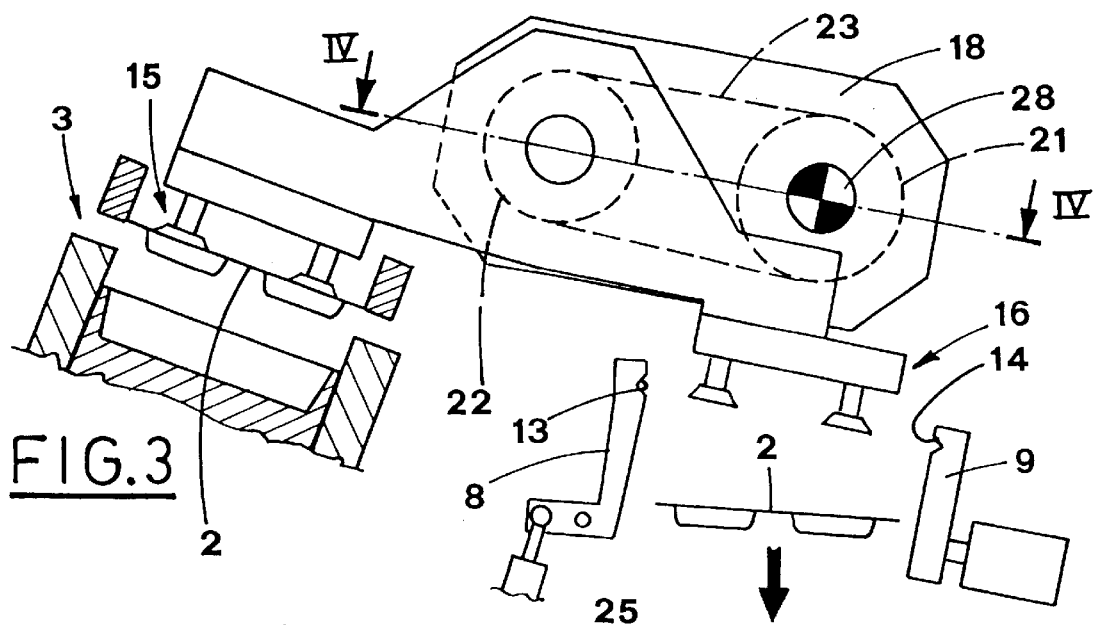
FIG. 3 shows the device, in still another working step, in a fragmentary side view.

The gripping means 15,16 are supported in the regions of opposite extremities of the this second arm 19, respectively on the left and on the right with reference to FIGS. 1 to 3.

Due to this construction, when the first arm 18 is in a first extreme position, i.e. turned towards the working station 3, the gripping means 15, on the left in FIG. 1, are located in the working station 3 for picking up at least one first blister pack 2a. The gripping means 16, on the right in FIG. 1, are located in the intermediate station 6 for picking up a second blister pack 2b kept by the clamp 7.

When the first arm 18 is in a second extreme position, i.e. turned towards the packaging line 4, the gripping means 15, on the left in FIG. 1, are located in the intermediate station 6 for releasing the first blister pack 2a, and the gripping means 16, on the right in FIG. 1, are located near the working run of the packaging line 4 for delivering the second blister pack 2b to the packaging line 4.

It is to be noted that the angle between the two planes on which the gripping means 15,16 lay supported by the second arm 19, is equal to half the angle α, which is the inclination angle of the blister packs 2 with respect to the horizontal plane, when they are made available at the station 3.

Therefore, the angle between the plane where the right gripping means 16 lay in the intermediate station 6, and the horizontal plane is equal to α/2.

In further detail, the first arm 18 is made in form of a casing, inside which motion transmission means are housed.

In particular, these motion transmission means include a first toothed pulley 21, connected with a second toothed pulley 22 by means of a belt 23 (see FIG. 4).

The axle 24 of the first toothed pulley 21 is rigidly fastened to the stationary frame 20. This axle 24 passes through the pivot 28 which defines the oscillation axis of the first arm 18 with respect to the above mentioned frame 20. The axle 24 and the pivot 28 are in coaxial relationship.

In practice, the arm 18 is rotatably supported by the axle 24, which is fastened to the frame 20. Another toothed pulley 25, aimed at receiving motion from known means, that are not shown, is made integral with the pivot 28, inside the frame 20. The second toothed pulley 22 is carried inside the casing forming the arm 18, idling on the pivot 29 of the second arm 19.

The axle of the second toothed pulley 22 is rigidly fastened to the second arm 19, and practically merges into the above mentioned pivot 29, that defines the pivot point of the second arm 19 with respect to the first arm 18.

In practice, when the first arm 18 rotates, the second toothed pulley 22 rotates in the opposite direction due to the action determined by the transmission belt 23, set around the first pulley 21, that is kept stationary.

Analogously, the second arm 19, integral with the pulley 22, rotates in the opposite direction of rotation of the first arm 18.

Obviously, the entity of this inverse rotation is determined by the gear ratio between the pulleys 21 and 22; if the gear ratio is unitary, the second arm 19 is rotate inversely at an angle equal to the rotation angle of the first arm 18.

Now, operation of the above described device will be illustrated beginning from a step, in which the first arm 18 is set in the first extreme position, i.e. turned towards the working station 3, with the left gripping means 15 located in the working station and the right gripping means 16 located in the intermediate station 6, as shown in FIG. 1.

Obviously, right and left are hereby used with reference to the gripping means only with illustrative purpose, and no limitation should be sought in this definition use for sake of clarity only.

Changing the positions of the station 3 and packaging line 4 will result in a corresponding change of the definition for the gripping means 15,16.

In this configuration, the left gripping means 15, picks up a first blister pack 2a situated in the above mentioned working station 3. If in the intermediate station 6 there is a second blister pack 2b kept by the clamp 7, then the right gripping means 16 will pick up this last mentioned blister pack 2b.

Beginning from this first extreme position, the first arm 18 of the mechanism 17 rotates and moves to a second extreme position. Now the left gripping means 15 are located in the regions of the intermediate station 6, and the right gripping means 16 are located near the working run of the packaging line 4, as shown in FIG. 2.

In practice, the arm 18, driven by motor means activating another pulley 25, performs a rotation of 180°, as indicated with the sketched line A.

In this second extreme position, the gripping means 15,16 release respectively the first blister pack 2a to the intermediate station 6 and the possible second blister pack 2b to the working run of the packaging line 4.

More precisely, the first arm 18 of the mechanism 17 drives the second arm 19, which is articulated thereto; the second arm 19 performs an inverse rotation with respect to the first arm 18, and this inverse rotation is caused by the transmission means constituted by the toothed pulleys 21, 22, so as to transfer the blister packs 2 to the horizontal position on the working run of the packaging line 4.

In fact, rotation of the first arm 18 determines a corresponding inverse rotation of the second toothed pulley 22 of the transmission means, linked by the belt 23 to the first toothed pulley 21, and the pulley 21 is rigidly fastened to the frame 20.

Rotation of the second toothed pulley 22 determines a corresponding rotation of the second arm 19, rigidly fastened to the axis 29 of the same pulley 22.

The diameter of the first pulley 21 is suitably bigger than the diameter of the second pulley 22, so that due to the gear ratio resulting therefrom, the entity of rotation of the same pulley 22 with respect to the stationary first pulley 21 is increased.

In particular, this increase of the rotation of the second pulley 22 is equal to half the angle α delimited between the inclination line of the blister packs 2 made available at station 3, and a generic horizontal plane, so as to impose to the second arm 19, integral with the same pulley 22, a corresponding increase in its rotation performed with respect to the first arm 18; this increase is equal to α/2.

This allows the second arm 19 to carry the blister packs 2 in horizontal configuration, when they have been transferred on the active run of the packaging line 4.

The increase of the rotation imposed to the arm 19, that is equal to α/2, is added to the mutual inclination angle, also equal to α/2, delimited between the laying surfaces of the gripping means 15,16, so as to obtain the full angle α, which angle the blister packs 2 have when they are made available at the working station 3.

Obviously, if the blister packs 2 were made available at the working station 3 on a horizontal plane, and not inclined, the gear ratio between the pulleys 21 and 22 should be unitary, so as to avoid the above mentioned increase of the inverse rotation imposed to the second arm 19 with respect to the first arm 18.

In the above mentioned second extreme position of the arm 18 and gripping means 15,16, the said first blister pack 2a is held between the brackets 8,9 of the clamp 7, which initially are in open position, as seen in FIG. 2.

Operation of the actuators 11,12 determines closure of the brackets 8,9 which thus keep the blister pack 2a.

Subsequently, the blister pack 2a is released by the first gripping means, so that they will be able to perform their return stroke to the first extreme position, due to inverse rotation of the mechanism 17.

During the subsequent step, the first blister pack 2a, held between the brackets 8,9 of the clamp 7, is picked up by the second gripping means 16, which carry it to the working run of the packaging line 4, as previously described for the second blister pack 2b.

If the blister pack is defective, suitable sensing means 30 will detect this and control means 31 will command the opening of the brackets 8,9 of the clamp 7 before the blister pack is picked up by the second gripping means 16, as shown in FIG. 3.

The defective blister pack falls onto suitable collecting means, which bring it away.

Therefore, the illustrated device achieves the object of transferring the blister packs from a working station, where individual blister packs are cut out from blister band, to a packaging line, where these blister packs are put into cases, removing at the same time possible defective blister packs.

One of the characteristics of the subject device lies in fact that possible defective blister packs are removed automatically in an intermediate station between the working station and the packaging line.

Therefore, this operation does not interfere with operations performed in the working station and with transporting action along the packaging line.

Another feature of the device derives from the fact that it is simple and practical; therefor, the device transfers blister packs to the packaging line and removes defective ones, keeping high working speed of the machine.

The above description is intended purely in terms of exemplification, so any variations in practice from the above technical description are to be considered within the terms of this application and the following claims.

What is claimed is:

1. A device for transferring blister packs from a working station to a packaging line, said blister packs being made available at said working station, said device comprising:

an intermediate station situated between said working station and said packaging line;

first gripping means, for picking up at least one first blister pack in the working station and for delivering said first blister pack to said intermediate station;

second gripping means, working in reciprocal phase relation with said first gripping means, for picking up at least one second blister pack in said intermediate station, and for delivering said second blister pack to said packaging line;

clamp means located in said intermediate station for receiving and holding said at least one blister pack during transferring to said packaging line, sensing means for sensing defective blister packs at said intermediate station, control means responsive to said sensing means to open said clamp means when a defective blister pack is to be discarded.

2. A device according to claim 1, wherein said first and second gripping means are supported and driven by a mechanism including a first arm oscillating about a first pivot in a vertical plane longitudinal to the packaging line, and a second arm, pivoted to the first arm and rotating about a second pivot in a vertical plane parallel to the plane of the first arm, and supporting on its opposite extremities said gripping means.

3. A device according to claim 2, wherein said first arm is provided with link means for transmitting motion to said second arm, these link means including:

a first stationary toothed pulley, fixed to said intermediate station in the region of said first pivot and connected, by a belt;

a second toothed pulley which is carried by the same first arm with free rotation about the axis of said second pivot and rigidly fastened to said second arm.

4. A device according to claim 2, wherein the blister packs are made available at said working station with a first pre-established angle with respect to a horizontal plane and are supported in said intermediate station with a second pre-established angle with respect to said horizontal plane, the laying planes concerned by said first and second gripping means being inclined with respect to each other by an angle which is equal to half said first pre-establishes angle.

5. A device according to claim 3, wherein said second pre-established angle is equal to half said first pre-established angle, and in that the diameter of said first pulley is bigger than the diameter of said second pulley, so as to obtain such a gear ratio that rotation of said second pulley with respect to said stationary first pulley is increased by an angle equal to half of said first pre-established inclination angle of the blister packs in said working station with respect to the horizontal plane, so as to impose the second arm, integral with said second pulley, a corresponding increase in its inverse rotation performed with respect to said first arm, equal to half said first pre-established angle.

6. A device according to claim 1, wherein said clamp means, that receive the blister packs, include a first bracket and a second bracket driven by respective actuators between a reciprocal opening position, in which at least one blister pack can be received, and a closed position, in which the received blister pack is held therebetween.

7. A device, according to claim 6, wherein said first bracket oscillates in a vertical plane longitudinal with respect to the blister movement direction, on a transversal pivot, and said second bracket moves while keeping the same attitude in the same longitudinal plane.

* * * * *